United States Patent [19]
Naito

[11] Patent Number: 5,560,761
[45] Date of Patent: Oct. 1, 1996

[54] TANTALUM POWDER AND ELECTROLYTIC CAPACITOR USING SAME

[75] Inventor: Hiroo Naito, Omiyamachi, Japan

[73] Assignee: Starck Vtech Ltd., Tokyo, Japan

[21] Appl. No.: 523,962

[22] Filed: Sep. 6, 1995

[30] Foreign Application Priority Data

Sep. 28, 1994 [JP] Japan .................................. 6-233306

[51] Int. Cl.$^6$ ................................................ C22C 27/02
[52] U.S. Cl. ........................... 75/255; 204/292; 361/529; 420/427
[58] Field of Search ............................... 75/255; 420/427; 204/292, 293; 361/529

[56] References Cited

U.S. PATENT DOCUMENTS

| | | | |
|---|---|---|---|
| 4,483,819 | 11/1984 | Albrecht et al. | 75/245 |
| 4,957,541 | 9/1990 | Tripp et al. | 420/427 |
| 5,211,741 | 5/1993 | Fife | 420/427 |
| 5,284,531 | 2/1994 | Fife | 75/255 |
| 5,407,458 | 4/1995 | König et al. | 75/255 |

*Primary Examiner*—George Wyszomierski
*Attorney, Agent, or Firm*—Oblon, Spivak, McClelland, Maier & Neustadt, P.C.

[57] ABSTRACT

Tantalum powder used as an anode material for an electrolytic capacitor comprising usual tantalum powder (having an average particle size ranging from 1.0 to 5.0 μm) mixed with tantalum powder having an average particle size on the order of nanometers (ranging from 10 to 500 nm) in an amount ranging from 1 to 25 parts by weight per 100 parts by weight of the former; an anode body for use in an electrolytic capacitor which is produced by sintering the tantalum powder; an electrolytic capacitor in which the anode body is incorporated. The tantalum powder ensures high strength of bonding with a tantalum wire even when it is pelletted at a low density and sintered at a low temperature, which has high strength such that it can withstand the thermal decomposition temperature of manganese nitrate and which permits the production of an anode body having excellent electrical properties, in particular, a high breakdown voltage in addition to the foregoing properties, an anode body produced using the tantalum powder and an electrolytic capacitor in which the anode body is incorporated.

6 Claims, No Drawings

TANTALUM POWDER AND ELECTROLYTIC CAPACITOR USING SAME

BACKGROUND OF THE INVENTION

The present invention relates to tantalum powder, in particular, tantalum powder used as an anode material for electrolytic capacitors, an anode body for electrolytic capacitors which is produced while making use of the tantalum powder and an electrolytic capacitor which comprises the anode body incorporated therein.

Tantalum powder for use in a tantalum solid capacitor is in general produced through the reduction of potassium tantalum fluoride ($K_2TaF_7$) with sodium metal:

$$K_2TaF_7 + 5Na \rightarrow Ta + 2KF + 5NaF$$

The tantalum spault produced by the reduction is disintegrated, washed with water to remove the salts as by-products, washed with an acid, dried and then heat-treated. Thereafter, a part of the resulting powder is subjected to oxygen-removal through a treatment with, for instance, magnesium metal for the purpose of reducing the oxygen content thereof to thus give a final product.

To the tantalum powder thus produced, there is added an appropriate binder, followed by pelletting, sintering and formation an anodized film of tantalum pentoxide, on the sintered body surface, through an anodization in an electrolyte such as an aqueous solution of phosphoric acid.

Then manganese dioxide as a solid electrolyte layer is formed on the sintered body surface on which the anodized film has been formed, through thermal decomposition of manganese nitrate, a graphite layer and a layer of a silver paste are further formed on the solid electrolyte layer and then the product is encapsulated with a resin to give a solid electrolytic capacitor. The bonding strength between a tantalum wire serving as a lead wire and the sintered body and the strength of the sintered body are important factors for the preparation of the electrolytic capacitor.

More specifically, when mounting a tantalum capacitor on a substrate through soldering, the resin expands and contracts due to thermal stress and thus the resin may peel off if the bonding strength between the tantalum wire and the sintered body is low. This may result in an increase in the leakage current.

Moreover, the strength of the sintered body should be sufficiently high so that the body can withstand thermal stress and the action of gaseous nitric acid as a by-product generated when manganese dioxide is deposited thereon as a solid electrolyte layer through the thermal decomposition of manganese nitrate.

In general, the formation of a strong bonding between the tantalum wire and the sintered body and the formation of a sintered body having high strength can be ensured by increasing the density during pelletting and raising the sintering temperature. However, an increase in the density during pelletting and a raise in the sintering temperature are accompanied by simultaneous decreases in electrical properties, in particular, a decrease in CV (capacity) and make the immersion of the sintered body in manganese nitrate difficult.

SUMMARY OF THE INVENTION

Accordingly, an object of the present invention is to provide tantalum powder which ensures high strength of bonding with a tantalum wire even when it is pelletted at a low density and sintered at a low temperature, which has high strength such that it can withstand the thermal decomposition temperature of manganese nitrate and which permits the production of an anode body having excellent electrical properties, in particular, a high breakdown voltage (B.D.V.) in addition to the foregoing properties, an anode body produced from the tantalum powder and an electrolytic capacitor in which the anode body is incorporated.

According to the present invention, there is provided tantalum powder used as an anode material for an electrolytic capacitor, which comprises usual tantalum powder (having an average particle size ranging from 1.0 to 5.0 μm) admixed with tantalum powder having an average particle size on the order of nanometers (ranging from 10 to 500 nm) in an amount ranging from 1 to 25 parts by weight per 100 parts by weight of the former.

According to other aspects of the present invention, there are provided an anode body for electrolytic capacitors produced by sintering the foregoing tantalum powder and an electrolytic capacitor in which the anode body is incorporated.

DESCRIPTION OF THE PREFERRED EMBODIMENTS

The term "usual tantalum powder" used in the present invention refers to tantalum powder produced by disintegrating the spault-like tantalum powder prepared through the reduction of potassium tantalum fluoride with sodium metal; washing with water to remove the salts as by-products, then washing with an acid, drying, subjecting to a heat-treatment and, thereafter, subjecting to oxygen-removal through a treatment with, for instance, magnesium metal and the tantalum powder usually has an average particle size ranging from 1.0 to 5.0 μm. Specific examples thereof include high voltage/low capacity powder having a CV ranging from 10,000 to 15,000μFV/g; high voltage/medium capacity powder having a CV ranging from 15,000 to 20,000μFV/g; medium voltage/high capacity pwder having a CV ranging from 20,000 to 30,000μFV/g; and low voltage/high capacity powder having a CV of not less than 30,000μFV/g.

The highly sinterable tantalum powder having a particle size on the order of namometers which is used as a sintering binder in the present invention may be tantalum powder having an average particle size of not higher than 500 nm, preferably not higher than 200 nm and most preferably 10 to 150 nm. Such tantalum powder products may be those produced through the foregoing reduction of potassium tantalum fluoride with sodium metal or those prepared by reducing tantalum pentachloride with hydrogen.

In the present invention, the tantalum powder having a particle size on the order of nanometers (hereunder referred to as "nano-size tantalum powder") is used in an amount ranging from 1 to 25 parts by weight and preferably 5 to 15 parts by weight per 100 parts by weight of the usual tantalum powder.

The tantalum powder comprising the nano-size tantalum powder can be pelletted at a low density, for instance, ranging from 4.0 to 6.0 g/cc, preferably 4.5 to 5.0 g/cc and can likewise be sintered at a relatively low temperature, for instance, ranging from 1350° to 1550° C. for 15 to 30 minutes to thus ensure contraction of the resulting pellet. In addition, the resulting sintered body can strongly be bonded to a tantalum wire, has a high strength which allows the sintered body to withstand the thermal decomposition temperature of manganese nitrate and has electrical properties sufficient for producing an anode body exhibiting a high breakdown voltage.

The present invention will hereunder be described in more detail with reference to the following working Examples.

EXAMPLE 1

To 100 parts by weight of medium voltage/high capacity powder (CV 30000μFV/g) prepared by a conventional method, there was added 5 or 10 parts by weight of nano-size (130 nm) tantalum powder prepared by the reduction of potassium tantalum fluoride with metallic sodium, the resulting mixture was pelletted and sintered under the conditions detailed below and the resulting anode body was inspected for the physical and electrical properties.

The results thus obtained are summarized in the following Tables 1 and 2.

The physical properties of the added nano-size tantalum powder and the conditions for pelletting, sintering and formation of the anode body as well as the conditions for measurements are as follows:

Nano-Size Tantalum Powder

Average particles size 130 nm; specific surface area (as determined through BET method) 2.71 m²/g; bulk density 0.68 g/cc; oxygen content 0.9%

Anode Body-Pelletting Conditions

Table 1: diameter 3 mm; 0.15 g pellet; pellet green density 5.0 g/cc

Table 2: diameter 3 mm; 0.15 g pellet; pellet green density 4.5 g/cc

Sintering Conditions

Table 1: at 1350° C. for 30 minutes
Table 2: at 1500° C. for 30 minutes

Conditions for Formation, Measurement

Table 1: CV (capacity), LC (leakage current); 0.01% $H_3PO_4$, Formation at 60° C., Formation at 40V, Measurement at 28V B.D.V. (breakdown voltage); 1.0% $H_3PO_4$ at 90° C.

Table 2: CV (capacity), LC (leakage current); 0.01% $H_3PO_4$, Formation at 60° C., Formation at 100V, Measurement at 70V B.D.V. (breakdown voltage); 1.0% $H_3PO_4$ at 90° C.

TABLE 1

| Rate of Addition (%) | CV (μFV/g) | LC (μA/g) | B.D.V. (V) | S.D. (g/cc) | Wire Pulling Strength (kg) | Sintered Body Strength (kg) |
| --- | --- | --- | --- | --- | --- | --- |
| 0 | 48,100 | 27 | 107 | 4.63 | 4.0 | 12 |
| 5 | 49,500 | 26 | 114 | 4.62 | 4.5 | 15 |
| 10 | 50,500 | 24 | 139 | 4.79 | 5.0 | 19 |

TABLE 2

| Rate of Addition (%) | CV (μFV/g) | LC (μA/g) | B.D.V. (V) | S.D. (g/cc) | Wire Pulling Strength (kg) | Sintered Body Strength (kg) |
| --- | --- | --- | --- | --- | --- | --- |
| 0 | 28,300 | 10 | 152 | 5.50 | 3.5 | 25 |
| 5 | 28,400 | 10 | 154 | 5.54 | 4.0 | 25 |
| 10 | 28,000 | 11 | 159 | 6.15 | 5.0 | 34 |

EXAMPLE 2

To 100 parts by weight of high voltage/medium capacity powder (CV 15000μFV/g) prepared by a conventional method, there was added 5 or 10 parts by weight of the same nano-size tantalum powder used in Example 1, the resulting mixture was pelletted and sintered under the conditions detailed below and the resulting anode body was inspected for the physical and electrical properties. The results thus obtained are summarized in the following Table 3.

Pellet: diameter 3 mm; 0.3 g; pellet green density 5.0 g/cc;

Sintered at 1550° C. for 30 minutes;

0.01% $H_3PO_4$, Formation at 90° C.;

Formation at 140V;

Measured at 98V;

B.D.V. 1.0% $H_3PO_4$, at 90° C.

TABLE 3

| Rate of Addition (%) | CV (μFV/g) | LC (μA/g) | B.D.V. (V) | S.D. (g/cc) | Wire Pulling Strength (kg) | Sintered Body Strength (kg) |
| --- | --- | --- | --- | --- | --- | --- |
| 0 | 15,000 | 4 | 180 | 6.08 | 13.0 | 57 |
| 5 | 15,100 | 4 | 184 | 6.46 | 14.0 | 72 |
| 10 | 14,700 | 5 | 190 | 6.63 | 15.5 | 81 |

As seen from the data listed in Tables 1 to 3, the addition of a small amount of nano-size tantalum powder allows an increase in the sintered density (S.D.) without causing any reduction of the CV (capacity) and LC (leakage current) values and, as a result, permits the improvement in the bonding power between the sintered body thereof and a wire, the strength and breakdown voltage of the sintered pellet thereof.

What is claimed is:

1. A tantalum powder mixture comprising a fast tantalum powder having an average particle size ranging from 1.0 to 5.0 µm mixed with a second tantalum powder having an average particle size ranging from 10 to 500 nm in an amount ranging from 1 to 25 parts by weight of the latter per 100 parts by weight of the former.

2. The tantalum powder mixture of claim 1 wherein the first tantalum powder is a member selected from the group consisting of high voltage/low capacity powder having a specific capacitance ranging from 10,000 to 15,000µFV/g; high voltage/medium capacity powder having a specific capacitance ranging from 15,000 to 20,000µFV/g; medium voltage/high capacity powder having a specific capacitance ranging from 20,000 to 30,000µFV/g; and low voltage/high capacity powder having a specific capacitance of not less than 30,000µFV/g.

3. An anode body for an electrolytic capacitor produced by sintering the tantalum powder mixture of claim 2.

4. An electrolytic capacitor comprising the anode body of claim 3 incorporated therein.

5. An anode body for an electrolytic capacitor produced by sintering the tantalum powder mixture of claim 1.

6. An electrolytic capacitor comprising the anode body of claim 5 incorporated therein.

* * * * *